Feb. 6, 1968   R. L. SMITH   3,367,347
TRUCK BED COVER AND TENT
Filed July 5, 1966   2 Sheets-Sheet 1
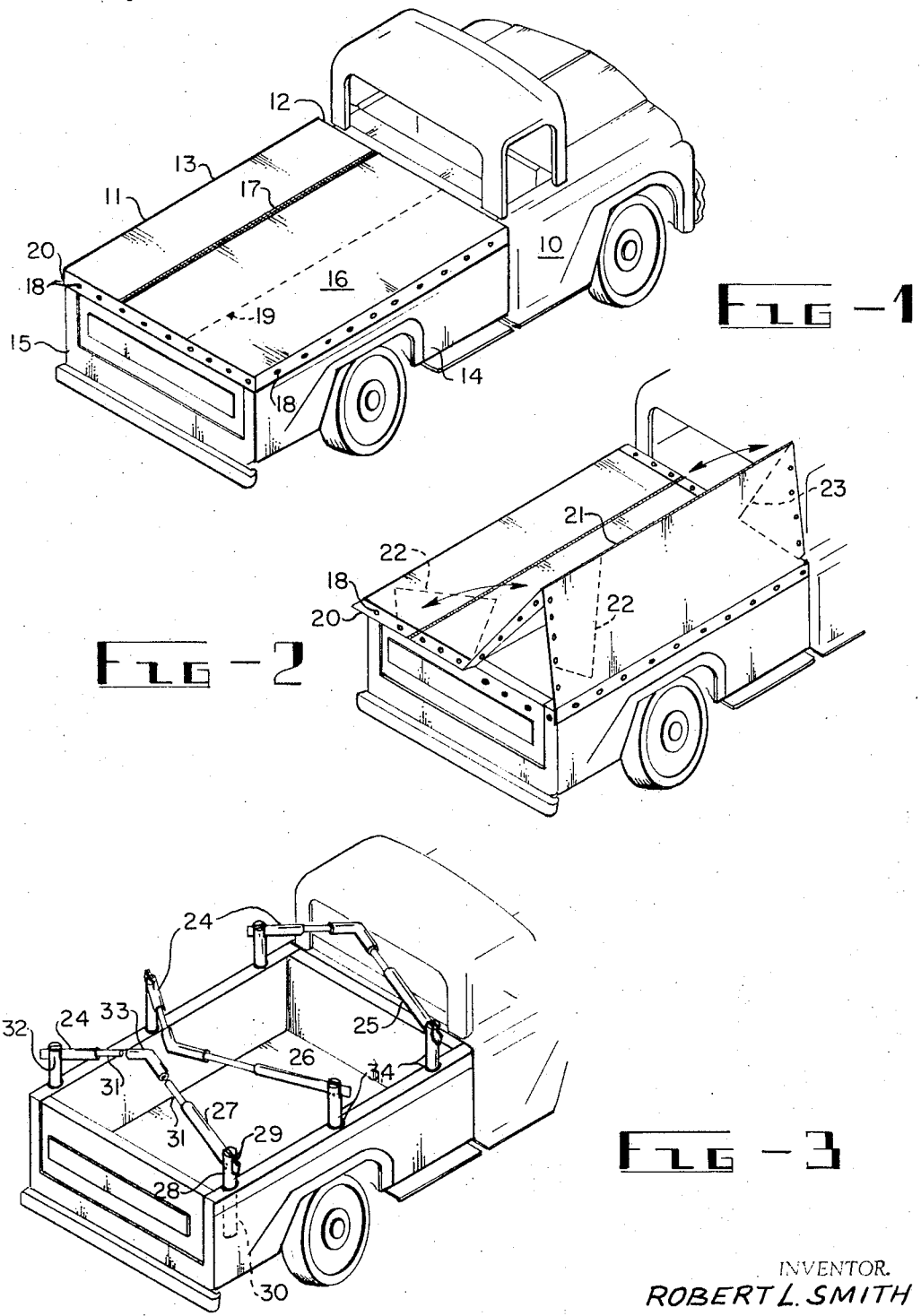
INVENTOR.
ROBERT L. SMITH
BY Carl R. Brown
ATTY.

Feb. 6, 1968  R. L. SMITH  3,367,347
TRUCK BED COVER AND TENT
Filed July 5, 1966  2 Sheets-Sheet 2

INVENTOR.
ROBERT L. SMITH
BY
Carl R. Brown
ATTY.

United States Patent Office 3,367,347
Patented Feb. 6, 1968

3,367,347
TRUCK BED COVER AND TENT
Robert L. Smith, 482 Center St., Apt. A,
Chula Vista, Calif. 92010
Filed July 5, 1966, Ser. No. 562,634
10 Claims. (Cl. 135—1)

This invention relates to a truck bed cover and tent and more particularly to a truck bed cover that may be used to cover the truck bed and alternatively to function as a tent for the truck bed.

Camping trucks or trailers that are adapted for camping, living in, or sleeping in when disposed at a camp site or the like, are well known. However, vehicles that carry camping facilities of the solid structure type are bulky and tend to be top heavy. Further such vehicles are expensive and cumbersome to drive or move around. Such vehicles do not readily lend themselves to other uses and considering the small amount of time they are actually used, are very expensive. Thus because of the less expense, tents are often used for camping or the like. However a tent must still be carried to the site by some type of vehicle, and using a tent that rests on the ground is often less desirable than using some type of housing on a vehicle. In addition tents are usually difficult to erect and when collapsed require a certain amount of storage space in the vehicle that has to carry it. Expansible trailers that carry tents have increased in use for the reasons just stated. But trailers still must be pulled by another vehicle, and are not capable of alternative use.

Accordingly it is an object of this invention to provide a new and improved truck bed cover and tent.

It is another object of this invention to provide a new and improved truck bed cover and tent that covers the truck bed and that may be quickly and easily erected in place on the truck bed as a tent.

It is another object of this invention to provide a new and improved truck bed cover and tent having a protective covering of a one piece material that may be quickly and conveniently unfolded on the truck and erected into a camping tent having sides and roof as well as front and back entrance doors.

It is another object of this invention to provide a new and improved truck bed cover and tent having a canvas covering with supports for changing from transporting to living condition, which change may be accomplished by relatively unskilled persons in a short period of time.

It is another object of this invention to provide a new and improved truck bed cover and tent in which the insertion of the supports and the erection of the tent can be accomplished without exposing the truck bed to weather conditions.

It is another object of this invention to provide a new and improved truck bed cover and tent that is practical and efficient in construction and operation, and that may be readily and economically produced and installed.

The present invention accomplishes the aforesaid objects by using a unique and novel cover for covering pick-up truck beds or the like and alternatively, as a camping tent mounted on the truck bed. The structure is simple enough for persons unfamiliar with camping and tents to erect the tent on the truck bed with little or no training. The tent is erected without the use of ropes, poles or stays. The cover comprises a folded-up and zipper-closed unit that is fastened at its edges by twist or snap fasteners to the outside edge of the cargo area walls or sides of the truck bed. The tent is erected by unsnapping the cover at the front and back edges of the truck bed, unzipping one zipper to expand the cover into a larger surface having side walls and front and back walls and inserting two or more individual support frames into recesses in the side walls of the truck bed. The support frames form the arch for supporting the center portion of the tent in its erected position. The recesses for receiving the support frames are vertical recesses that are already in the sides of most pick-up trucks. The front and back walls can be provided with zippered openings to provide entrances.

Upon lowering the tent, the support frames are rotated in a manner that the arch is lowered. The frames are then removed from the recesses and disassembled and stored. The excess portion of the tent is folded under and the zippered portion zipped, reducing the tent into a cover for the truck bed that has dimensions corresponding to the size of the truck bed. The edges of the cover are then fastened to the sides of the truck bed thereby making a tight cover.

Other and further objects of the present invention will be apparent from the following description and claims and are illustrated in the accompanying drawings which, by way of illustration, show a preferred embodiment of the present invention and the principles thereof.

In the drawings:

FIGURE 1 is a rear perspective view of a truck having the present invention mounted thereon with the cargo compartment shown in covered condition for transport and the like.

FIGURE 2 is a similar perspective rear view of a truck and illustrates the first step of unzipping the cover and the second step of unfastening the cargo cover edge at the front and rear end of the cargo container side walls for conversion of the cargo cover into a camping tent structure.

FIGURE 3 is a perspective rear view of a truck and illustrates the third step of converting the cargo cover into a camping tent, wherein a plurality of support frames are inserted in the side walls of the cargo container.

Figure 4:
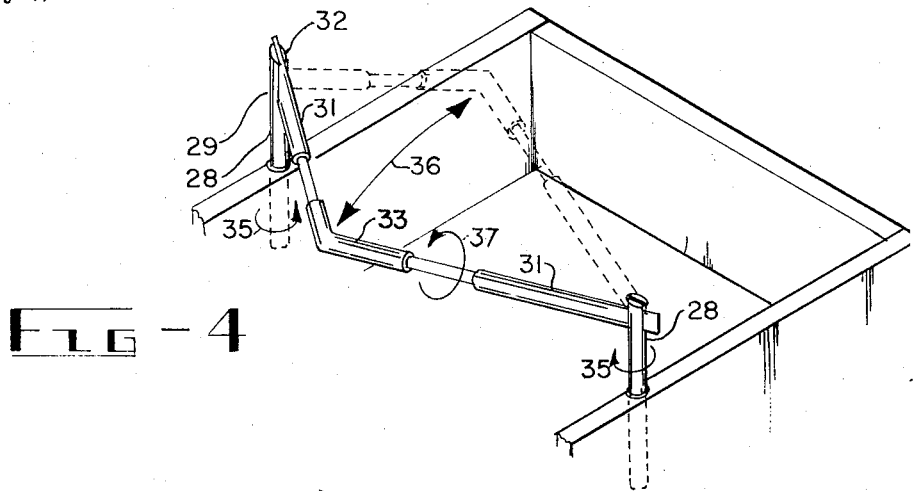
FIGURE 4 is a partial perspective view illustrating the support frame pivotal features and the last step for tent erection.

Referring now to the drawings wherein like redeference characters designate corresponding parts throughout the figures, there is shown in FIGURE 1 a pickup truck 10 or the like having truck bed or cargo container compartment 11 with an upright rear wall or tailgate 15, upright sides walls 13 and 14 and an upright front wall 12. A cargo cover 16, provided with a zipper 17 and reinforced fastening buttons or holes 18, is secured over the container 11. The zipper 17 extends parallel with the longitudinal axis of the cover 16 and folds away excess tent material 19 under the upper surface. The upright front wall 12, side walls 13 and 14 and rear wall 15 are provided with a plurality of spaced apart twist or snap-on fasteners 20 or the like that coincide with the locations of the reinforced buttons or holes 18 in the cover 16 and thus provide a sturdy fastening or tie down means that secure the cargo cover 16 over the pick-up truck bed 11.

In erecting the cover 16 to make a tent, zipper 17 is unzipped allowing the cover to unfold, see FIGURE 2. End flaps 22 and 23 are then able to unfold and swing into vertical position. Zippers 38 are operable to join the end flaps to form the ends of the tent when erected.

The structure for supporting the cover in the tent configuration comprises frames 25, 27, and 26. The number of frames depends, of course, on the length of the tent or truck bed and the degree of support desired. The frames comprise pole 28 that fit into recesses 30 in the side walls of the truck bed. These poles may be round or may be made squade to match the normally square recesses 30. The poles have a slot in the upper end for receiving the substantially flat end extension 29 of connecting frame 27. The flat end extensions 29 are pivotally secured to the poles 28 by a pin connection 32. Mounted in the end of the hollow connecting frame 27, or secured thereto, is a rod 31 that coacts with a hollow curved tube member 33 that forms the center arch.

It may be seen that by rotating pole 28, when the pole is cylindrical, in recess 30 and by pivoting frame 27; arch member 33 can be simultaneously slipped onto rods 31 forming an integral frame that can then be rotated into a framing arch. The friction in the slip joint connection of rod 31 and arch member 33 is normally sufficient to hold the frame in the upright arching position. Where friction is not sufficient then a known set screw construction (not shown) can be used to hold the frame in the desired upright position. Should the pole 28 be made square, then the entire frame is assembled and then poles 28 are inserted in square recesses 30 and the frame is held in the desired vertical position.

Figure 5:
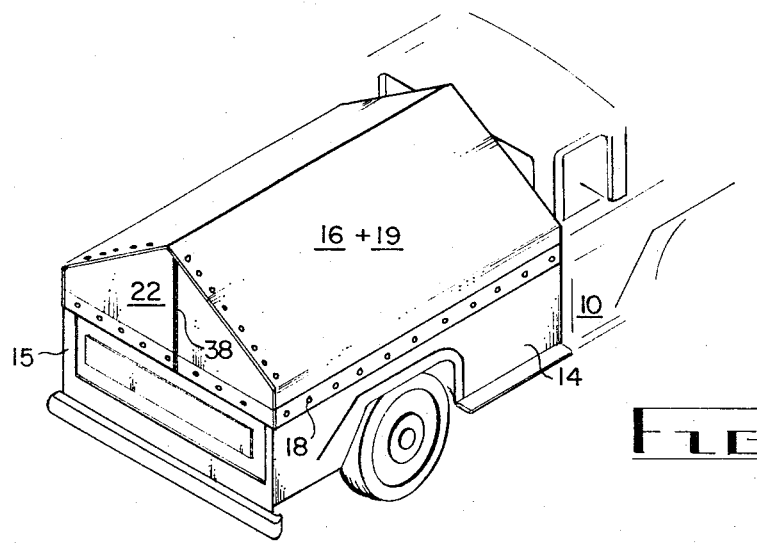
FIGURE 5 is a perspective rear view illustration of the truck with the cover erected as a tent.
Figure 6:
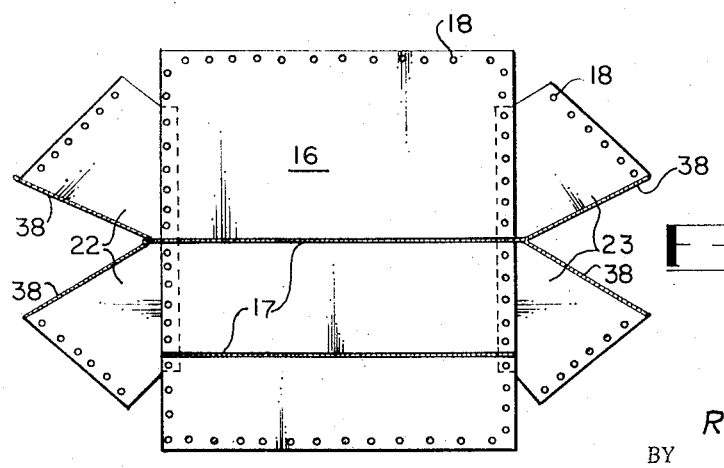
FIGURE 6 is a plan view of the cargo cover in a flat unfolded condition.

With reference to FIGURE 4, the erection of the frame members is illustrated. The arrows 35 represent the rotational directional movement that poles 28 turn when the frame members 31, inter-connected by arch member 33, are moved into the erected position by swinging along the arch 36. The cargo cover may be made of standard tent material or any other suitable material and is shown in FIGURE 6 in a completely unfolded condition. The rear flaps 22 and the front flaps 23 are sewed onto the rectangular portion with angularly directed edges to provide correct alignment of the fastening holes when the cover is erected as a tent. The edges supporting the zipper 38 also diverge in the flat position so that when zipped in the erected position, the ends will have a natural flat configuration as shown in FIGURE 5.

In operation, the cover is erected as a tent by unlocking the fasteners 18 holding the ends of the cargo cover 16. Zipper 17 is then unfastened and the excess material unfolded. The support frame members are then erected either by unfastening fasteners 18 on one side 13 or 14 of the truck bed. The poles 30 are then inserted in recesses 30 and arch member 33 is slipped onto the ends of rods 31. Where cylindrical poles 30 are used, the cover can be erected with the sides being fastened to walls 13 and 14, such as during inclement weather, by crawling underneath the cover material and rotating the frame members as shown in FIGURE 4. This raises the tent material 21 into the erected position. When the square poles are used the frame is erected and then the cover is refastened on the one side 13 or 14. The ends flaps are joined by closing zippers 38, and are fastened by securing the row of fasteners 18 to the corresponding fasteners on the front wall 12 and the tailgate 15. The zippers 38 can, of course, be unzipped as desired to enter the tent. The tailgate 15 can be lowered as desired by unfastening the end flaps 22. To return the tent to its function as a cover, the end flaps 22 and 23 are unzipped and unfastened and the frame members are either rotated to the down position and are removed or one side of the cover is unfastened and the frame members are lifted out of the recesses 30 and are then disassembled. The end flaps are folded under the cover and the cover is folded over longitudinally, see FIGURE 2, and zipper 17 is refastened. The end fasteners 18 on the rectangular portion of the cover 16 are refastened an the cover has been returned to the original condition as shown in FIGURE 1.

Although various minor structural modifications might be suggested to the preferred embodiment herein described by way of illustrative example only, it should be understood that many changes could be effected to the exemplary structure herein described without departing from the spirit of the present invention, and accordingly, it should be further understood that the inventor wishes to enclose within the scope of the patent warranted hereon, all such modifications as reasonably and properly come within the scope of the inventor's contribution to the art.

What is claimed is:

1. A cargo cover for vehicles having a cargo container area with upright walls and said cargo cover being capable of conversion into a camping tent comprising, cover means for covering said container area;

support frame means being capable of being selectively erected at spaced apart intervals on said container for supporting said cover means;

a plurality of fastening means mounted on spaced apart locations on said upright walls;

said cover means being provided with a plurality of fastening components for cooperating with said fastening means and releasably securing said cover over said container; and said cover being provided midway its width with longitudinal fastening means that extend substantially the length of said cover for holding, when fastened, the cover area to that area substantially equal to said container area and when unfastened allowing said cover to unfold increasing said area of said cover to that area required for use as a tent on said cargo container.

2. A cargo cover for vehicles as defined in claim 1 wherein;

said support frame means comprises pole means for being mounted vertically in said walls;

and releasable telescoping members being connected between ones of said pole means for forming an arch and supporting said unfolded cover as a tent.

3. A cargo cover for vehicles as defined in claim 1 wherein;

said fastening means are mounted on the outside upper edges of said walls;

and said fastening components are mounted around the edges of said cover.

4. A cargo cover for vehicles as defined in claim 1 wherein;

said cover having a rectangular configuration portion with a pair of flaps at each end;

and said flaps having an angular shape relative to said rectangular configuration portion and being releasably joined at adjacent sides.

5. A cargo cover for vehicles as defined in claim 4 wherein;

said fastening components are positioned at the edges of said rectangular configuration portions for securing said cover to said fastening means when said longitudinal fastening means is fastened;

and the edge of said flaps opposite said rectangular configuration portion having portions of said fastening components for securing said flaps to said fastening means when said longitudinal fastening means is unfastened.

6. A cargo cover for vehicles as defined in claim 5 wherein;

said flaps are releasably joined by zipper means.

7. A cargo cover for vehicles as defined in claim 5 wherein;

the sides of said flaps lay at an angle with the sides of said rectangular configuration portion when said cover is in a flat position.

8. A cargo cover for vehicles as defined in claim 1 wherein;

said support frame means comprises cylindrical pole means for being mounted vertically in said walls and being capable of rotational movement;

frame members being mounted on said pole means for vertical pivotal movement and non-rotational movement;

said frame members slidable engaging a curved arch member thereby joining said frame members between said pole members and shaping said support frame means into an arch shape; and said rotational movement of said pole means and said pivotal movement of said frame members cooperating to rotate said arch shape from a horizontal position to a vertical position.

9. A cargo cover for vehicles as defined in claim 8 wherein;

said frame members being capable of rotating said arch shape from said horizontal position to said vertical position when said fastening means and said fastening components are connected and said longitudinal fastening means is unfastened.

10. A cargo cover for vehicles as defined in claim 1 wherein;

said longitudinal fastening means is a zipper type fastener.

References Cited

UNITED STATES PATENTS

| | | | |
|---|---|---|---|
| 1,068,352 | 7/1913 | Lyttle | 135—1 |
| 1,499,972 | 7/1924 | Canfield. | |
| 2,334,435 | 11/1943 | Patterson et al. | 135—4 |
| 2,565,746 | 8/1951 | Turner. | |
| 2,846,262 | 8/1958 | Ray. | |
| 3,001,813 | 9/1961 | Johnson. | |

REINALDO P. MACHADO, *Primary Examiner.*